US012749259B2

(12) United States Patent
Ranjan et al.

(10) Patent No.: US 12,749,259 B2
(45) Date of Patent: Sep. 29, 2026

(54) IMAGE GENERATION SYSTEM WITH CONTROLLABLE SCENE LIGHTING

(71) Applicant: Apple Inc., Cupertino, CA (US)

(72) Inventors: Anurag Ranjan, Sunnyvale, CA (US); Kwang M Yi, Vancouver (CA); Cuneyt O Tuzel, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 230 days.

(21) Appl. No.: 18/451,242

(22) Filed: Aug. 17, 2023

(65) Prior Publication Data

US 2024/0153201 A1 May 9, 2024

Related U.S. Application Data

(60) Provisional application No. 63/422,111, filed on Nov. 3, 2022.

(51) Int. Cl.
*G06T 15/50* (2011.01)
*G06T 15/08* (2011.01)
*G06T 17/00* (2006.01)

(52) U.S. Cl.
CPC .............. *G06T 15/50* (2013.01); *G06T 15/08* (2013.01); *G06T 15/506* (2013.01); *G06T 17/00* (2013.01)

(58) Field of Classification Search
CPC .............................. G06T 15/50; G06T 15/506
See application file for complete search history.

(56) References Cited

U.S. PATENT DOCUMENTS 11,715,248 B2 * 8/2023 Saragih .................. G06T 15/04 345/426
2015/0146082 A1 5/2015 Kim et al.
2016/0255333 A1 9/2016 Nisenzon et al.
2018/0225865 A1 * 8/2018 Lecocq .................. G06T 15/80
2023/0027890 A1 * 1/2023 Zhao ...................... G06T 15/04
(Continued)

OTHER PUBLICATIONS

Chan, Eric R., et al. "Efficient geometry-aware 3d generative adversarial networks." Proceedings of the IEEE/CVF conference on computer vision and pattern recognition. 2022. (Year: 2022).*
(Continued)

*Primary Examiner* — Ryan Mcculley
(74) *Attorney, Agent, or Firm* — Treyz Law Group, P.C.; Jason Tsai

(57) ABSTRACT

An electronic device may include a light based image generation system configured to generate images of a 3-dimensional object in a scene. The light based image generation system can include a feature extractor, a triplane decoder, and a volume renderer. The feature extractor can receive lighting information about the scene and a perspective of the object in the scene and generate corresponding triplane features. The triplane decoder can decode diffuse and specular reflection parameters based on the triplane features. The volume renderer can render a set of images based on the diffuse and specular reflection parameters. A super resolution image can be generated from the set of images and compared with ground truth images to fine tune weights, biases, and other machine learning parameters associated with the light based image generation system. The light based image generation system can be conditioned to generate photorealistic images of human faces.

22 Claims, 6 Drawing Sheets

(56) References Cited

U.S. PATENT DOCUMENTS

2024/0020915 A1* 1/2024 Zhang .................... G06T 15/50

OTHER PUBLICATIONS

Ranjan, Anurag, et al. "Facelit: Neural 3d relightable faces." Proceedings of the IEEE/CVF Conference on Computer Vision and Pattern Recognition. 2023. (Year: 2023).*

Shi, Zifan, et al. "Deep generative models on 3d representations: A survey." arXiv preprint arXiv:2210.15663 (2022). (Year: 2022).*

Tan, Feitong, et al. "Volux-gan: A generative model for 3d face synthesis with hdri relighting." ACM SIGGRAPH 2022 Conference Proceedings. 2022. (Year: 2022).*

Zhihao Xia et al., Training Image Estimators without Image Ground-Truth, 33rd Conference on Neural Information Processing Systems, 2019, pp. 1-11, Curran Associates Inc., Red Hook, NY, USA.

* cited by examiner

IMAGE GENERATION SYSTEM WITH CONTROLLABLE SCENE LIGHTING

This application claims the benefit of U.S. Provisional Patent Application No. 63/422,111, filed Nov. 3, 2022, which is hereby incorporated by reference herein in its entirety.

BACKGROUND

This relates generally to electronic devices, and, more particularly, to electronic devices having systems for outputting computer generated imagery.

Some electronic devices can include systems for generating photorealistic images of a 3-dimensional object such as images of a face. Three-dimensional (3D) generative frameworks have been developed that leverage state-of-the-art two-dimensional convolution neural network based image generators to generate realistic images of a human face. Existing 3D generative frameworks model the geometry, appearance, and color of an object or scene captured from an initial viewpoint and are capable of rendering a new image of the object or scene from a new viewpoint. However, the existing 3D generative frameworks are not able to render new images under different lighting conditions.

It is within this context that the embodiments herein arise.

SUMMARY

An electronic device can be provided with a light based image generation system capable to generating photorealistic images of three-dimensional (3D) objects such as images of a face. The light based image generation system can generate images of any given 3D object under different scene/ambient lighting conditions and from different perspectives.

A method of generating an image of an object in a scene may include receiving lighting information about the scene and a perspective of the object in the scene, extracting corresponding features based on the received lighting information and perspective, decoding diffuse and specular reflection parameters based on the extracted features, and rendering a set of images based on the decoded diffuse and specular reflection parameters. The extracted features can be triplane features. The set of images may be obtained using volume rendering operations.

A method of operating an image generation system to generate an image of a 3D object may include capturing an image of the 3D object using a camera, conditioning the image generation system to generate an image of the 3D object, and generating images of the 3D object under different lighting conditions based on a trained model that uses diffuse and specular lighting parameters. The diffuse and specular lighting parameters may be decoded separately. The trained model may be a 3D generative model that is trained using unlabeled ground truth images of real human faces. The image generated system can be used to generate an avatar of a user under different environment lighting conditions and under different poses.

A method of training a light based image generation system may include receiving lighting and pose information and extracting corresponding features, obtaining diffuse and specular parameters based on the extracted features, rendering a set of images based on the diffuse and specular parameters, generating a super resolution image from the set of images, and comparing the super resolution image to one or more ground truth images to adjust weights associates with the light based image generation system.

DETAILED DESCRIPTION

Figure 1:
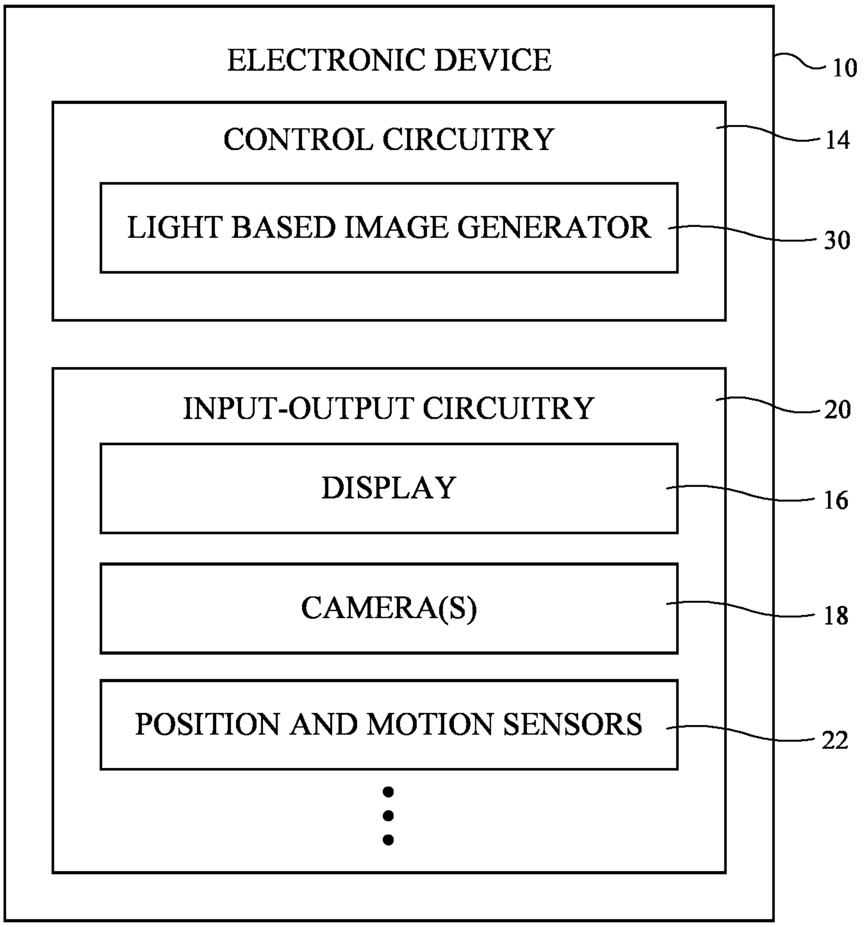
FIG. 1 is a schematic diagram of an illustrative electronic device in accordance with some embodiments.

An illustrative electronic device is shown in FIG. 1. Electronic device 10 may be a computing device such as a laptop computer, a computer monitor containing an embedded computer, a tablet computer, a cellular telephone, a media player, or other handheld or portable electronic device, a smaller device such as a wrist-watch device, a pendant device, a headphone or earpiece device, a device embedded in eyeglasses or other equipment worn on a user's head, or other wearable or miniature device, a display, a computer display that contains an embedded computer, a computer display that does not contain an embedded computer, a gaming device, a navigation device, an embedded system such as a system in which electronic equipment with a display is mounted in a kiosk or automobile, or other electronic equipment. Electronic device 10 may have the shape of a pair of eyeglasses (e.g., supporting frames), may form a housing having a helmet shape, or may have other configurations to help in mounting and securing the components of one or more displays on the head or near the eye of a user.

As shown in FIG. 1, electronic device 10 (sometimes referred to as head-mounted device 10, head-mounted display 10, etc.) may have control circuitry 14. Control circuitry 14 may be configured to perform operations in electronic device 10 using hardware (e.g., dedicated hardware or circuitry), firmware and/or software. Software code for performing operations in electronic device 10 and other data is stored on non-transitory computer readable storage media (e.g., tangible computer readable storage media) in control circuitry 14. The software code may sometimes be referred to as software, data, program instructions, instructions, or code. The non-transitory computer readable storage media (sometimes referred to generally as memory) may include non-volatile memory such as non-volatile random-access memory (NVRAM), one or more hard drives (e.g., magnetic drives or solid-state drives), one or more removable flash drives or other removable media, or the like. Software stored on the non-transitory computer readable storage media may be executed on the processing circuitry of control circuitry 14. The processing circuitry may include application-specific integrated circuits with processing circuitry, one or more microprocessors, digital signal processors, graphics processing units, a central processing unit (CPU) or other processing circuitry.

In accordance with some embodiments, control circuitry 14 may include an image generation system such as image generator 30 configured to generate one or more images of an object. Image generator 30 may be a software framework, may be implemented using hardware components, or may be a combination or software and hardware components. Image generator 30 can generate two-dimensional (2D) images of a three-dimensional (3D) object, scene, or environment. For example, image generator 30 can be used to generate photorealistic images of a face from different perspectives (points of view) and/or under different environment/scene lighting conditions. Image generator 30 can therefore sometimes be referred to as a "light based" image generation system 30.

Electronic device 10 may include input-output circuitry 20. Input-output circuitry 20 may be used to allow data to be received by electronic device 10 from external equipment (e.g., a tethered computer, a portable device such as a handheld device or laptop computer, or other electrical equipment) and to allow a user to provide electronic device 10 with user input. Input-output circuitry 20 may also be used to gather information on the environment in which electronic device 10 is operating. Output components in circuitry 20 may allow electronic device 10 to provide a user with output and may be used to communicate with external electrical equipment.

As shown in FIG. 1, input-output circuitry 20 may include a display such as display 16. Display 16 may be used to display images for a user of electronic device 10. Display 16 may be a transparent display so that a user may observe physical objects through the display while computer-generated content is overlaid on top of the physical objects by presenting computer-generated images on the display. A transparent display may be formed from a transparent pixel array (e.g., a transparent organic light-emitting diode display panel) or may be formed by a display device that provides images to a user through a beam splitter, holographic coupler, or other optical coupler (e.g., a display device such as a liquid crystal on silicon display).

Alternatively, display 16 may be an opaque display that blocks light from physical objects when a user operates electronic device 10. In this type of arrangement, a pass-through camera may be used to display physical objects to the user. The pass-through camera may capture images of the physical environment and the physical environment images may be displayed on display 16 for viewing by the user. Additional computer-generated content (e.g., text, game-content, other visual content, etc.) may optionally be overlaid over the physical environment images to provide an extended reality (XR) environment for the user. When display 16 is opaque, the display may also optionally display entirely computer-generated content (e.g., without displaying images of the physical environment).

Display 16 may include one or more optical systems (e.g., lenses) (sometimes referred to as optical assemblies) that allow a viewer to view images on display(s) 16. A single display 16 may produce images for both eyes or a pair of displays 16 may be used to display images. In configurations with multiple displays (e.g., left and right eye displays), the focal length and positions of the lenses may be selected so that any gap present between the displays will not be visible to a user (e.g., so that the images of the left and right displays overlap or merge seamlessly). Display modules (sometimes referred to as display assemblies) that generate different images for the left and right eyes of the user may be referred to as stereoscopic displays. The stereoscopic displays may be capable of presenting two-dimensional content (e.g., a user notification with text) and three-dimensional content (e.g., a simulation of a physical object such as a cube).

Input-output circuitry 20 may include various other input-output devices. For example, input-output circuitry 20 may include one or more cameras 18. Cameras 18 may include one or more outward-facing cameras (that face the physical environment around the user when the electronic device is mounted on the user's head, as one example). Cameras 18 may capture visible light images, infrared images, or images of any other desired type. The cameras may be stereo cameras if desired. Outward-facing cameras may capture pass-through video for device 10.

As shown in FIG. 1, input-output circuitry 20 may include position and motion sensors 22 (e.g., compasses, gyroscopes, accelerometers, and/or other devices for monitoring the location, orientation, and movement of electronic device 10, satellite navigation system circuitry such as Global Positioning System circuitry for monitoring user location, etc.). Using sensors 22, for example, control circuitry 14 can monitor the current direction in which a user's head is oriented relative to the surrounding environment (e.g., a user's head pose). The outward-facing cameras in cameras 18 may also be considered part of position and motion sensors 22. The outward-facing cameras may be used for face tracking (e.g., by capturing images of the user's jaw, mouth, etc. while the device is worn on the head of the user), body tracking (e.g., by capturing images of the user's torso, arms, hands, legs, etc. while the device is worn on the head of user), and/or for localization (e.g., using visual odometry, visual inertial odometry, or other simultaneous localization and mapping (SLAM) technique).

Input-output circuitry 20 may also include other sensors and input-output components if desired (e.g., gaze tracking sensors, ambient light sensors, force sensors, temperature sensors, touch sensors, image sensors for detecting hand gestures or body poses, buttons, capacitive proximity sensors, light-based proximity sensors, other proximity sensors, strain gauges, gas sensors, pressure sensors, moisture sensors, magnetic sensors, microphones, speakers, audio components, haptic output devices such as actuators, light-emitting diodes, other light sources, wired and/or wireless communications circuitry, etc.).

A physical environment refers to a physical world that people can sense and/or interact with without the aid of an electronic device. In contrast, an extended reality (XR) environment refers to a wholly or partially simulated environment that people sense and/or interact with via an electronic device. For example, the XR environment may include augmented reality (AR) content, mixed reality (MR) content, virtual reality (VR) content, and/or the like. With an XR system, a subset of a person's physical motions, or representations thereof, are tracked, and, in response, one or more characteristics of one or more virtual objects simulated in the XR environment are adjusted in a manner that comports with at least one law of physics. Many different types of electronic systems can enable a person to sense and/or interact with various XR environments. Examples include head mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. Device configurations in which electronic device 10 is a head-mounted device that is operated by a user in XR context are sometimes described as an example herein.

Head-mounted devices that display extended reality content to a user can sometimes include systems for generating photorealistic images of a face. Three-dimensional (3D) generative frameworks have been developed that model the geometry, appearance, and color of an object or scene captured from an initial viewpoint and are capable of rendering a new image of the object or scene from a new viewpoint. However, the existing 3D generative frameworks entangle together the various components of an image such as the geometry, appearance, and lighting of a scene and are thus not capable of rendering new images under different lighting conditions.

Figure 2:
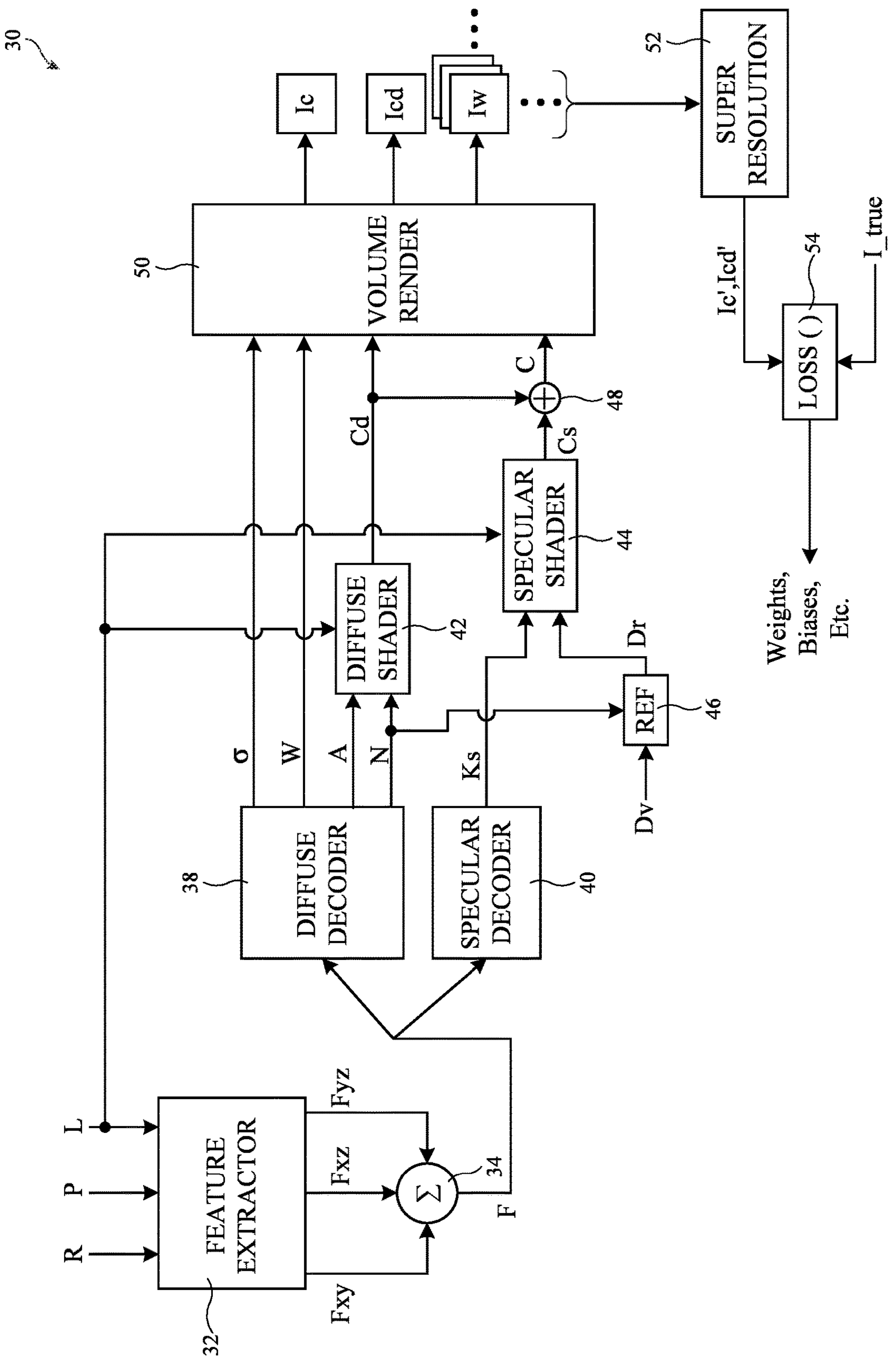
FIG. 2 is a diagram of an illustrative light based image generation system that can be included in the electronic device of FIG. 1 in accordance with some embodiments.

In accordance with an embodiment, device 10 can be provided with light based image generation system 30 that is capable of generating photorealistic images of 3D objects such as 3D faces with controllable scene/environment lighting. Light based image generation system 30 is capable of learning a 3D generative model from one or more 2D images and can render new images based on the learned 3D generative model from different views and under various lighting conditions. As shown in FIG. 2, image generation system 30 can include a feature extraction component such as feature extractor 32, decoding components such as decoders 38 and 40, physical shading components such as diffuse shader 42 and specular shader 44, a rendering component such as volume renderer 50, and a resolution improvement component such as super resolution component 52.

Feature extractor component 32 may have inputs configured to receive a random number (code) R, a perspective or pose P, and lighting information L and may have outputs on which corresponding triplane (orthogonal) features Fxy, Fxz, and Fyz are generated based on the R, P and L inputs. Feature extractor component 32 can be implemented as a generative adversarial network (GAN) configured to generate 2D images of faces. If desired, other state-of-the art 2D convolution neural network (CNN) based feature generators or other types of feature extraction components can be employed. Such CNN based feature generators can generate a different face depending on the input random number R. If the random number R remains fixed, extractor 32 will generate images of the same face. If the random number R changes, extractor 32 will generate images of a different face.

The perspective P determines a viewpoint (point of view) of the generated face and is therefore sometimes referred to as the head pose, camera pose, or point of view. Perspective P can be generated using a light-weight perspective estimation component. For example, a first generated image of a given face using a first perspective value might show the face from a frontal viewpoint or perspective. As another example, a second generated image of the face using a second perspective value different than the first perspective value might show the left side of the face from a first side viewpoint or perspective. As another example, a third generated image of the face using a third perspective value different than the first and second perspective values might show the right side of the face from a second side viewpoint or perspective. As another example, a fourth generated image of the face using a different perspective value might be skewed towards the top side of the face from an elevated viewpoint or perspective. As another example, a fifth generated image of the face using a different perspective value might be skewed towards the bottom side of the face from a lower viewpoint or perspective. In general, feature extractor 32 can generate features representing any given object from any desired viewpoint or perspective.

The lighting input L can be represented using spherical harmonics or spherical harmonic coefficients. Lighting information L can be generated using a light-weight lighting estimation component. In general, the lighting information L can encode lighting distributions in a scene and can be referred to as a light map, an environment illumination map, an irradiance environment map, or an ambient lighting map. Adjusting input L can control the lighting of the final image generated using extractor 32. For example, extractor 32 can extract features corresponding to a first image of a given face under a first environment lighting condition where a light source is emitted from the right of the face. As another example, extractor 32 can extract features corresponding to a second image of the face under a second environment lighting condition where a light source is emitted from the left of the face. As another example, extractor 32 can extract features corresponding to a third image of the face under a third environment lighting condition where a light source is emitted from behind the face (e.g., such that a silhouette of the head is shown). In general, the lighting information L can include more than one light source of the same or different intensity levels from any one or more locations in a scene.

Perspective P and lighting information L are provided as separate inputs to system 30. The diffuse decoder 38, specular decoder 40, diffuse shader 42, and specular shader 44 within the overall 3D generative framework of system 30 can be used to enforce the physical lighting models encoded in L. This ensures that the environment illumination is disentangled from the geometric properties of an object or scene, which enables generation of images of 3D objects at varying camera angles (perspectives) and different scene lighting conditions. For example, image generation system 30 can generate different perspectives of a human face under different ambient lighting conditions, such as lighting for a human face in a dark bedroom, lighting for a human face in an office with overhead lighting, lighting for a human face in a brightly lit environment, lighting for a human face in a forest with speckled lighting, or other real-life, virtual reality, mixed reality, or extended reality environments.

Feature extraction component 32 may output the generated 2D image encoded in the form of a triplane feature vector having orthogonal 3D features Fxy, Fxz, and Fyz. For any point x in a 3D space, the aggregated features can be obtained by summing Fxy, Fxz, and Fyz. In FIG. 2, the aggregated features F can be obtained using feature aggregation component 34. The aggregated features F can be fed to decoding components such as a diffuse decoder 38 and a specular decoder 40 that separately model the diffuse and specular components of the rendered color. Based on the aggregated features, the diffuse decoder 38 can be configured to decode or predict, for any given point x in the 3D space, its volume density a, feature projections W, an albedo A, and surface normal N. The outputs of diffuse decoder 38 are sometimes referred to as diffuse parameters.

Feature projections W can include additional channel information that can be used by volume renderer 50 to generate feature image Iw. As an example, feature projections W can include, in addition to red, green and blue channels, information associated with 29 different channels. This is merely illustrative. The feature projections may generally include information from fewer than 29 channels, from more than 29 channels, from 10-20 channels, from 30-50 channels, from 50-100 channels, or from any suitable number of channels. Albedo A represents the true color of a 3D surface. Normal N represents a vector that is perpendicular to the 3D surface at given point x.

Separately, specular decoder 40 is configured to decode or output a shininess coefficient Ks and/or other specular reflection parameters. The value of shininess coefficient Ks may be indicative of how shiny or rough the 3D surface is at any given point x. The shininess coefficient may describe the breadth of the angle of specular reflection. A smaller coefficient corresponds to a broader angle of specular reflection for a rougher surface. A larger coefficient corresponds to a narrower angle of specular reflection for a smoother surface. The output(s) of specular decoder 40 is sometimes referred to as specular parameter(s). The albedo A, normal N, and shininess coefficient Ks relating to the physical properties of a 3D surface are sometimes referred to collectively as surface parameters.

The diffuse shader component 42 may receive lighting information L, albedo A, and surface normal N and generate a corresponding diffuse color Cd using the following equation:

$$Cd=A\odot\Sigma_{k=0}L_k\cdot H_k(N) \quad (1)$$

where $L_k$ represent the spherical harmonics coefficients and where $H_k$ represent the spherical harmonics basis. As an example, the lighting map can be represented using nine spherical harmonic coefficients (e.g., k∈[1,9]). This is merely illustrative. The lighting, illumination, or irradiance map can be represented using fewer than nine spherical harmonics (SH) coefficients, more than nine SH coefficients, 9-20 SH coefficients, or more than 20 SH coefficients.

The specular shader component 44 may receive lighting information L, shininess coefficient Ks from specular decoder 40, and a reflection direction Dr that is a function of view direction Dv and surface normal N. A reflection direction computation component 46 may compute the reflection direction Dr using the following equation:

$$Dr=Dv-2(Dv\cdot N)N \quad (2)$$

Specular shader 44 can then generate a corresponding specular color Cs using the following equation:

$$Cs=Ks\odot\Sigma_k L_k\cdot H_k(Dr) \quad (3)$$

where $L_k$ represent the spherical harmonics coefficients, where $H_k$ represent the spherical harmonics basis, where Ks represents the shininess coefficients, and where Dr represents the reflection direction. The final or total color C is a composition of the diffuse color Cd obtained using diffuse shader 42 based on equation (1) and the specular color Cs obtained using specular shader 44 based on equation (3). A summing component such as sum component 48 can be used to add the diffuse and specular components Cd and Cs.

Volume rendering component 50 may receive volume density a and feature projections W directly from diffuse decoder 38, diffuse color Cd from diffuse shader 42, and the final composed color C from adder component 48. Volume rendering component 50 may be a neural volume renderer configured to a 3D feature volume into a 2D feature image. Volume rendering component 50 can render a corresponding color image Ic by tracing over the combined color C, a diffuse image Icd by tracing over the diffuse colors Cd, and multiple feature images Iw by tracing over feature projections W. Super resolution component 52 may upsample the rendered images to produce a final color image Ic' guided by the feature images Iw, where Ic' exhibits a much improved image resolution over color image Ic. Super resolution component 52 can also optionally obtain a super resolved diffused image Icd' based on image Icd guided by feature images Iw.

The super resolved images such as Ic' and Icd' output from super resolution component 52 may be compared with actual images I_true of a 3D object (e.g., with images of a real human face) using a loss function 54. The loss function 54 can compute a distance or other difference metric(s) between Ic' (or Icd') and I_true, which can then be used to adjust weights, biases, or other machine learning or neural network parameters associated with the 3D generative framework of system 30. The 2D images output from feature extractor 32 can represent images of real human faces or can also represent images of imaginary human faces (e.g., fictitious faces that do not correspond to the face of any real human). Unlabeled data sets such as images I_true of real human faces or real 3D objects can be used to supervise the training of system 30. Images I_true that are used to perform machine learning training operations are sometimes referred to and defined as “ground truth” images. The weights, biases, and/or other machine learning (ML) parameters optimized via this training process can be used to fine tune the 3D modeling functions associated with feature extractor 32 and decoders 38, 40.

Figure 3:
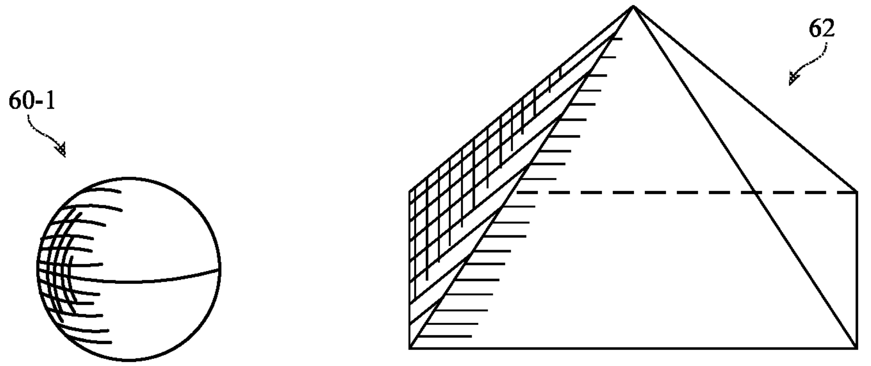
FIG. 3 is a diagram showing a front view of an illustrative three-dimensional (3D) object under a first scene lighting condition in accordance with some embodiments.

Since image generation system 30 is conditioned using perspective P and lighting L as controllable inputs, system 30 can be used to generate images of 3D objects from different perspectives and under various lighting conditions. FIG. 3 is a diagram showing a front view of an illustrative three-dimensional (3D) object such as a pyramid 62 under a first scene lighting condition. The first scene lighting condition is represented by light sphere 60-1, which shows environment lighting being emitted from the right side of the scene and casting shadows towards the left side of the scene. The scene lighting condition can sometimes be referred to as an ambient lighting condition, a global illumination condition, or an environment/scene light or irradiance map. Such lighting condition or map can be encoded using spherical harmonics coefficients, which can be provided as inputs to feature extractor 32, diffuser shader 42, and specular shader 44 as described above in connection with FIG. 2. As a result, system 30 can generate an image of pyramid 62 that shows the right side of the pyramid being more lit and more shadows on the left side of the pyramid, with specular reflections in certain regions of the image and diffuse reflections in other regions of the image.

Figure 4:
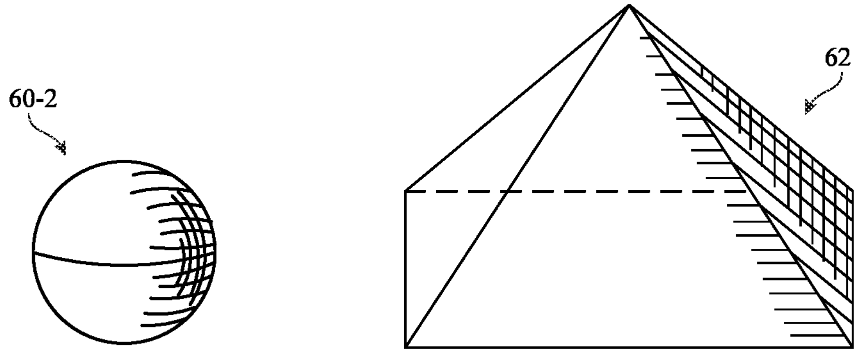
FIG. 4 is a diagram showing a front view of an illustrative three-dimensional (3D) object under a second scene lighting condition in accordance with some embodiments.

System 30 can generate a new image of the same pyramid under a different scene lighting condition. FIG. 4 is a diagram showing again the front view of pyramid 62 under a second scene lighting condition. The second scene lighting condition is represented by light sphere 60-2, which shows environment lighting now being emitted from the left side of the scene and casting shadows towards the right side of the scene. Such lighting condition can be encoded using spherical harmonics coefficients, which can be provided as inputs to feature extractor 32, diffuser shader 42, and specular shader 44 as described above in connection with FIG. 2. As a result, system 30 can generate another image of pyramid 62 that shows the left side of the pyramid being more lit and more shadows on the right side of the pyramid, with specular reflections and diffuse reflections in different portions of the final image.

Figure 5:
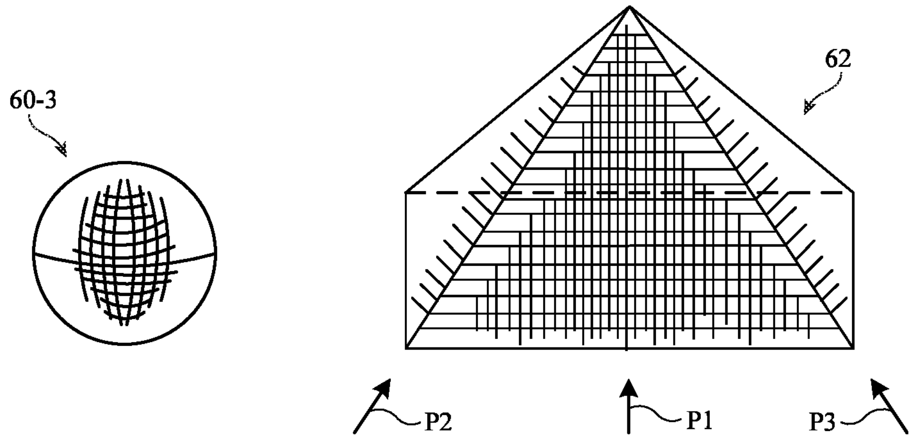
FIG. 5 is a diagram showing a front view of an illustrative three-dimensional (3D) object under a third scene lighting condition in accordance with some embodiments.

FIG. 5 is a diagram showing again the front view of pyramid 62 under a third scene lighting condition. The third scene lighting condition is represented by light sphere 60-3, which shows environment lighting now being emitted from the behind the scene and casting shadows in front of the scene. Such lighting condition can be encoded using spherical harmonics coefficients, which can be provided as inputs to feature extractor 32, diffuser shader 42, and specular shader 44 as described above in connection with FIG. 2. As a result, system 30 can generate another image of pyramid 62 that shows the left and right edges of the pyramid being slightly lit and the front of the pyramid being in shadows, with optionally specular reflections and diffuse reflections in different portions of the final image.

As shown by FIGS. 3-5, light based (light conditioned) image generation system 30 can independently control the desired environment lighting and generate images of 3D objects under any environment lighting conditions. For example, system 30 can independently adjust the number of light sources in an environment, the location and direction of each light source, the color of each light source, the quality of each light source, the size of each light source, etc. The examples shown in FIG. 3-5 showing images of a 3D pyramid are also merely illustrative. In general, light based image generation system 30 can be used to generate images of real and/or imaginary (fictitious or fictional) faces under any number of ambient/scene lighting conditions.

Light based image generation system 30 can also generate images of an object from different perspectives or viewpoints (e.g., system 30 can generate images of a human head at different head poses). In the examples of FIGS. 3-5, the images of pyramid 62 are shown from the frontal perspective (see viewpoint P1 in FIG. 5). System 30 can generate additional images of pyramid 62 from different perspectives such perspective P2 looking towards the left side of the pyramid or perspective P3 looking towards the right side of the pyramid.

Figure 6:
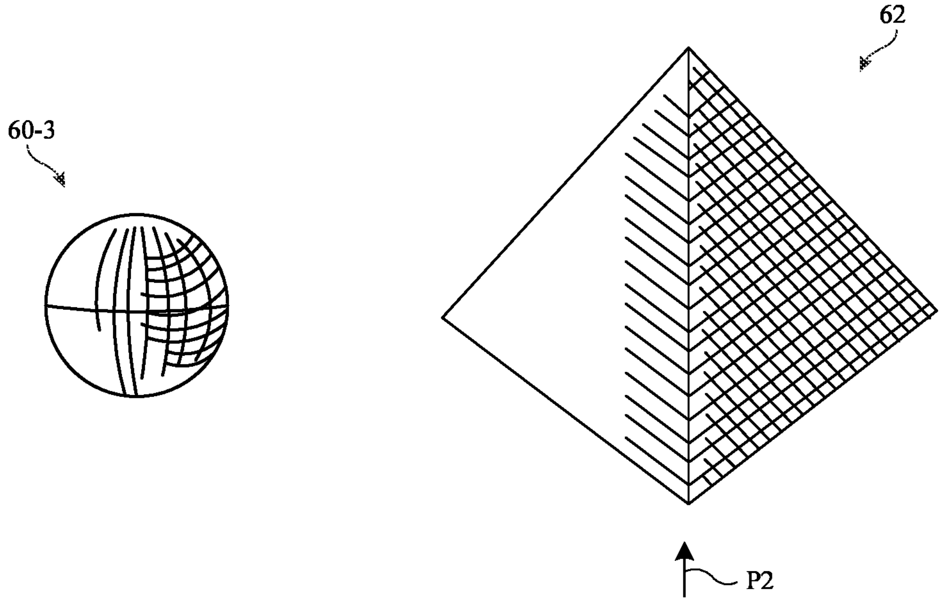
FIG. 6 is a diagram showing a first side view of an illustrative three-dimensional (3D) object under the third scene lighting condition in accordance with some embodiments.

FIG. 6 is a diagram showing another generated image of pyramid 62 from perspective P2 under the third scene lighting condition. The third scene lighting condition is represented by light sphere 60-3, which shows environment lighting now being emitted from the left side of the scene when viewing from viewpoint P2 and casting shadows towards the right side of the scene. As a result, the generated image of pyramid 62 as shown in FIG. 6 shows the left side of the pyramid being lit and the right side of the pyramid being in shadows, with optionally specular reflections and diffuse reflections in different portions of the final image.

Figure 7:
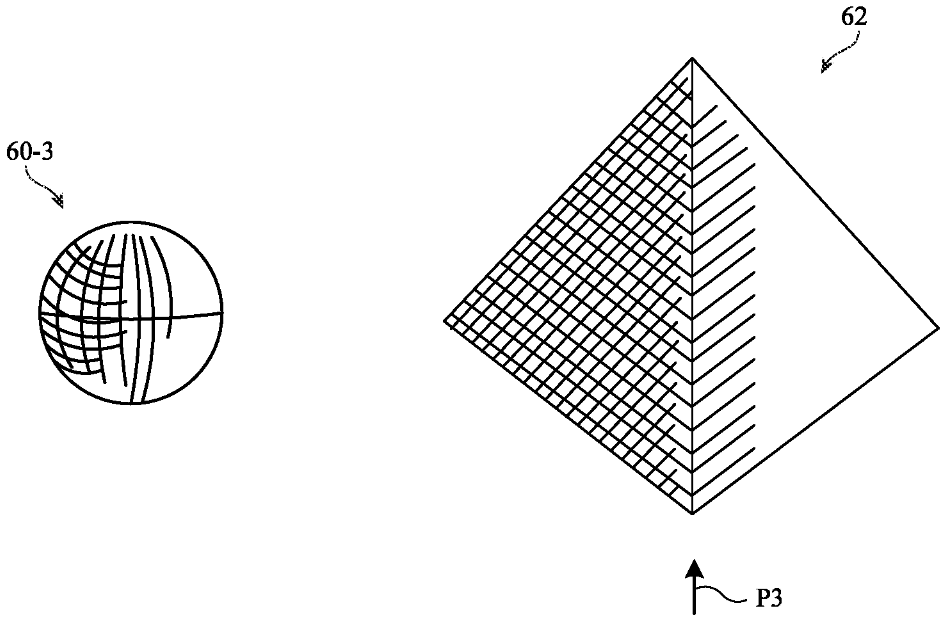
FIG. 7 is a diagram showing a second side view of an illustrative three-dimensional (3D) object under the third scene lighting condition in accordance with some embodiments.

FIG. 7 is a diagram showing another generated image of pyramid 62 from perspective P3 under the third scene lighting condition. The third scene lighting condition is represented by light sphere 60-3, which shows environment lighting now being emitted from the right side of the scene when viewing from viewpoint P3 and casting shadows towards the left side of the scene. As a result, the generated image of pyramid 62 as shown in FIG. 7 shows the right side of the pyramid being lit and the left side of the pyramid being in shadows, with optionally specular reflections and diffuse reflections in different portions of the final image.

As shown by FIGS. 6-7, image generation system 30 can independently control the desired perspective or viewpoint and generate images of 3D objects from any camera perspective or point of view. Image generation system 30 of this type can also sometimes be referred to as a perspective based conditioned or pose based conditioned image generation system. For example, system 30 can effectively render images of a 3D object as it is rotated about a pitch axis, a roll axis, and/or a yaw axis. The examples shown in FIGS. 6 and 7 showing images of a 3D pyramid are also merely illustrative. In general, light based and perspective based image generation system 30 can be used to generate images of real and/or imaginary (fictitious or fictional) faces from any perspective or at any head pose.

Figure 8:
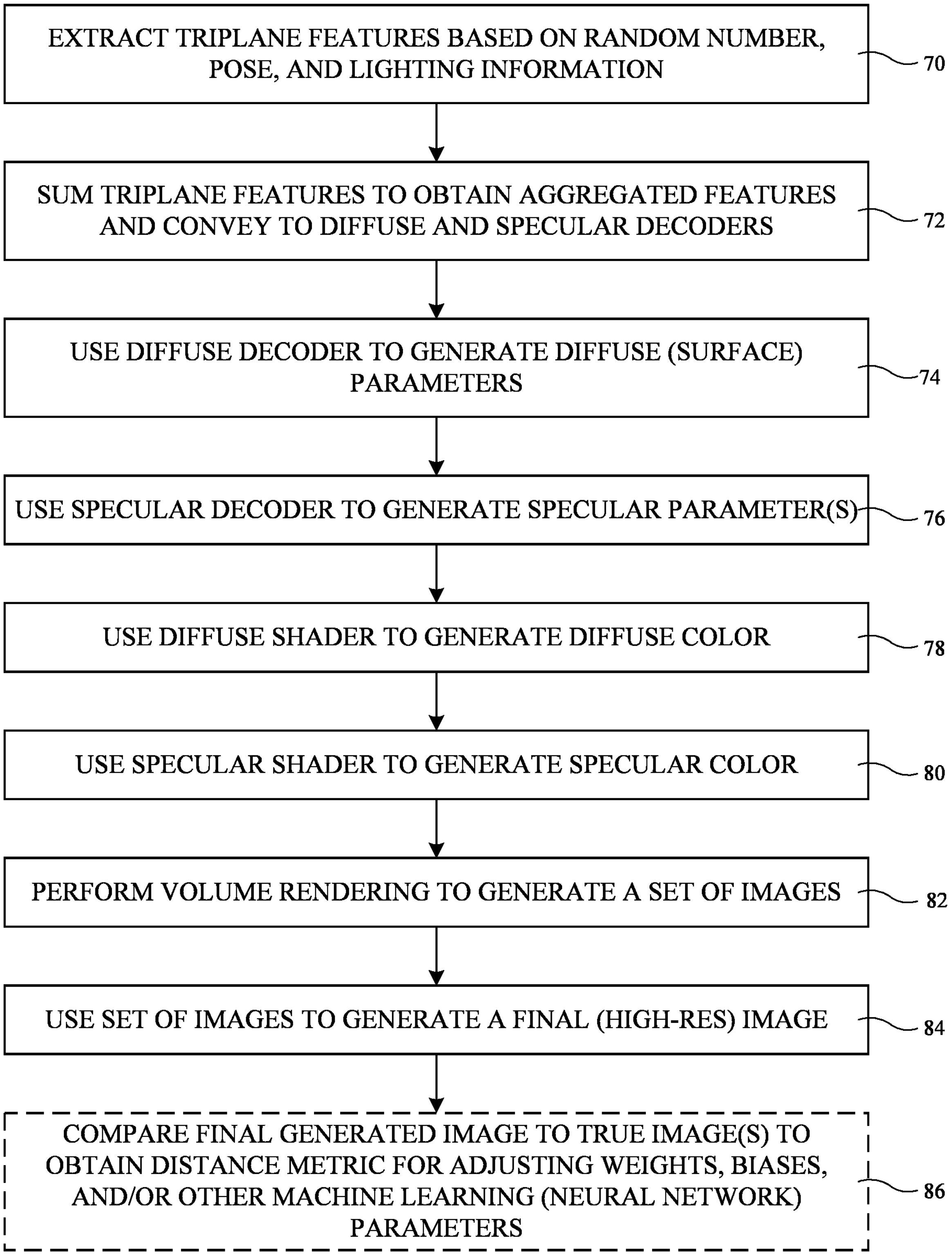
FIG. 8 is a flow chart of illustrative steps for operating a light based image generation system of the type shown in FIG. 2 in accordance with some embodiments.

FIG. 8 is a flow chart of illustrative steps for operating light based image generation system 30 of the type shown in FIG. 2. During the operations of block 70, feature extractor 32 can be used to extract triplane features based the random number R input, the pose/perspective P input, and the lighting information L input. Lighting L can be represented using spherical harmonics coefficients (as an example). Feature extractor 32 can generate orthogonal triplane features Fxy, Fxz, and Fyz. For any given point x in the 3D space, an aggregated feature can be obtained by summing together the corresponding triplane features during the operations of block 72. The aggregated features can then be conveyed to diffuse decoder 38 and specular decoder 40. Diffuser decoder 38 can be used for outputting diffuse reflection (lighting) parameters, whereas specular decoder 40 can be used for outputting specular reflection (lighting) parameters.

During the operations of block 74, diffuse decoder 38 can be used to generate diffuse (surface) parameters. For example, diffuse decoder 38 can be configured to generate a volume density a output, a projection features W output, an albedo A output, and a surface normal N output. During the operations of block 76, specular decoder 40 can be configured to generate a shininess coefficient Ks. Decoders 38 and/or 40 can be implemented using multilayer perception (MLP) based decoders with one or more hidden layers (as an example). FIG. 8 showing block 74 preceding block 76 is merely illustrative. In practice, the operations of blocks 74 and 76 may occur in parallel or simultaneously. In other embodiments, the operations of block 76 might preceding that of block 74.

During the operations of block 78, diffuse shader 42 can be used to generate a diffuse color Cd output based on the lighting L input, the albedo A, and the surface normal N. The diffuse color Cd may not include any specular reflectance information. During the operations of block 80, specular shader 55 can be used to generate a specular color Cs output based on the lighting L input, the shininess coefficient Ks, and a reflection direction Dr that is a function of view direction Dv and normal N. The specular color Cs may not include any diffuse reflection information. After both diffuse color Cd and specular color Cs have been generated, a final (total) color C output can be obtained by adding Cd and Cs.

During the operations of block 82, volume rendering operations can be performed to generate a set of lower resolution images. For example, volume render 50 can render a corresponding color image Ic by tracing over the combined color output C, can render a diffuse image Icd by tracing over the diffuse color output Cd, and can render multiple feature images Iw by tracing over feature projections W. During the operations of block 84, the set of images obtained from block 82 can be used to generate one or more final (high-resolution) images. For example, super resolution module 52 may upsample the rendered images Ic and Iw to produce a final super resolution color image Ic'. Super resolution module 52 may optionally upsample the rendered images Icd and Iw to produce another final super resolution diffuse image Icd'.

Before light based image generation system 30 can generate photorealistic images, system 30 has to be trained using ground truth images. The ground truth images can be actual images of 3D objects such as images of real human faces or other physical objects. Thus, during machine learning training operations, an additional step 86 can be performed. During the operations of block 86, the final super resolution image(s) can be compared with ground truth images (sometimes referred to as true images) using a loss function to obtain a distance or other error metric. The true images can be unlabeled data sets. A distance/error metric obtained in this way can be used to adjust weights, biases, and/or other machine learning (neural network) parameters to help fine tune the 3D generative model or framework of system 30. Once trained, light based image generation system 30 can output photorealistic images of 3D objects such as photorealistic images of a face by performing the operations of blocks 70-84. The operations of block 86 can optionally be omitted once system 30 is sufficiently trained.

Figure 9:
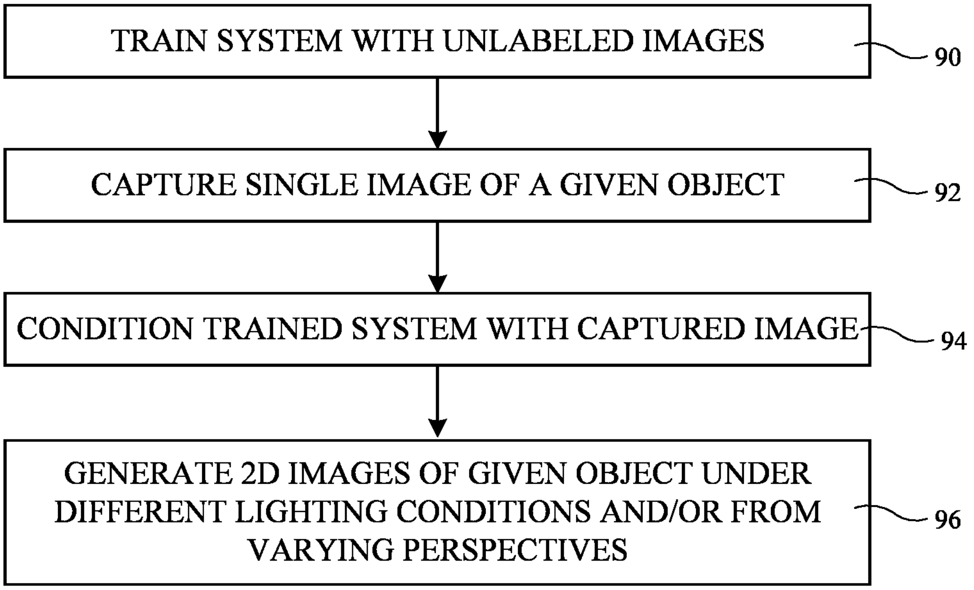
FIG. 9 is a flow chart of illustrative steps for using the light based image generation system described in connection with FIGS. 1-8 to generate new images under different lighting conditions and/or varying perspectives based on a captured image of a real-life object in accordance with some embodiments.

The operations shown in FIG. 8 can be used to photorealistic images of imaginary (fictitious) faces depending on the random number (code) R that is provided as an input to feature extractor 32. In some embodiments, light based image generation system 30 can also be used to generate images of a user of device 10 such as to generate a virtual representation (sometimes referred to as an avatar) of the user in an extended reality environment. FIG. 9 is a flow chart of illustrative steps for using light based image generation system 30 of the type described in connection with FIGS. 1-8 to generate images of a user's face under different lighting conditions and/or varying perspectives (e.g., at different camera or head poses) based on a single captured image of the user.

During the operations of block 90, light based image generator system 30 can be trained using unlabeled images such as unlabeled ground truth images of hundreds, thousands, or millions of real human faces. For example, the steps of blocks 70-86 shown in FIG. 8 can be repeated on the unlabeled dataset to train the 3D generative model of system 30 to fine tune the weights, biases, and other machine learning parameters so that the error metric computed at step 86 is minimized.

During the operations of block 92, a single image of a given 3D object can be captured. For example, one or more cameras 18 in device 10 (see FIG. 1) can be used to capture a 2D image of the user's face, head, or other body part(s). In one embodiment, only one captured image is needed to generate an avatar of the user. In other embodiments, multiple captured images of the user's face can be used to enhance the accuracy of the final avatar.

During the operations of block 94, the captured image(s) from step 92 can be fit into the trained image generation system 30. One way of fitting or conditioning the captured image into system 30 is to find the unique random number R that corresponds to the user's face. By fixing input R to such unique code, system 30 can only generate photorealistic images of the user's face. Another way of fitting or conditioning the captured image into system 30 is to feed the captured image as an additional input to feature extractor 32. By conditioning feature extractor 32 with the captured image of the user's face or head, the final images output from the super resolution module 52 should correspond to photorealistic images of the user's face. If desired, other ways of fitting or conditioning system 30 with the captured image(s) from step 92 can be employed.

During the operations of block 96, light based image generation system 30 can generate 2D images of the given object under different lighting conditions and/or from varying perspectives. For example, system 30 can be used to generate an avatar of the user from any perspective (e.g., by controlling perspective input P) and/or under any desired lighting condition (e.g., by independently controlling lighting input L).

The examples above in which light based image generation system 30 can be used to generate photorealistic images of a human face is merely illustrative. In general, image generation system 30 can be trained to generate images of any 3D object in a scene. For example, image generation system 30 can configured to generate photorealistic images of different body parts of a real or imaginary human, real or imaginary animals, cartoons, foods, machines, robots, monsters and other fantastical creatures, inanimate objects, and/or an 3D environment.

To help protect the privacy of users, any personal user information that is gathered by sensors may be handled using best practices. These best practices including meeting or exceeding any privacy regulations that are applicable. Opt-in and opt-out options and/or other options may be provided that allow users to control usage of their personal data.

The foregoing is merely illustrative and various modifications can be made to the described embodiments. The foregoing embodiments may be implemented individually or in any combination.

What is claimed is:

1. A method of generating an image of an object in a scene, the method comprising:
- receiving lighting information of the scene and a perspective of the object in the scene;
- extracting geometric features based on the received lighting information and the perspective;
- with a diffuse decoder, generating diffuse reflection parameters from the extracted geometric features;
- with a specular decoder, generating one or more specular reflection parameters from the extracted geometric features; and
- performing volume rendering based on the diffuse reflection parameters and the one or more specular reflection parameters to output a set of images.

2. The method of claim 1, further comprising:
- adjusting the lighting information so that the set of images are rendered under a different scene lighting condition.

3. The method of claim 2, further comprising:
- adjusting the perspective so that the set of images are rendered from a different point of view.

4. The method of claim 1, wherein:
- extracting the geometric features comprises extracting triplane features based on the received lighting information and the perspective;
- the diffuse reflection parameters are decoded from the triplane features; and
- the one or more specular reflection parameters are decoded from the triplane features.

5. The method of claim 1, wherein the lighting information is represented by spherical harmonic coefficients.

6. The method of claim 1, further comprising:
- aggregating the extracted geometric features to obtain aggregated features, wherein the diffuse reflection parameters and the one or more specular reflection parameters are decoded from the aggregated features.

7. The method of claim 1, wherein generating the diffuse reflection parameters comprises outputting parameters selected from the group consisting of: a volume density, feature projections, an albedo, and a surface normal.

8. The method of claim 7, wherein generating the one or more specular reflection parameters comprises outputting a shininess coefficient.

9. The method of claim 8, further comprising:

obtaining a diffuse color based on the received lighting information, the albedo, and the surface normal.

10. The method of claim 9, further comprising:

obtaining a specular color based on the received lighting information, the shininess coefficient, and a reflection direction.

11. The method of claim 10, wherein performing volume rendering comprises performing volume rendering as a function of the volume density, the feature projections, and a total color that is equal to a sum of the diffuse color and the specular color.

12. The method of claim 11, wherein performing volume rendering to output the set of images comprises rendering a color image based on the total color and rendering a plurality of feature images based on at least the feature projections, the method further comprising:

generating a super resolution image by upsampling the rendered color image while being guided by the plurality of feature images.

13. The method of claim 12, further comprising:

computing a distance vector between the super resolution image and a ground truth image; and adjusting weights and biases associated with the feature extracting operation and the diffuse and specular reflection decoding operations based on the computed distance vector.

14. A method of operating an image generation system to generate an image of a given 3-dimensional (3D) object, the method comprising:

with a camera, capturing an image of the given 3D object;

conditioning the image generation system to generate an image of the given 3D object; and generating images of the given 3D object under different lighting conditions by:

receiving lighting information about an environment in which the given 3D object is located and a perspective of the given 3D object in the environment;

with a feature extractor, extracting corresponding orthogonal features based on the received lighting information and the perspective; and decoding diffuse and specular lighting parameters based on the orthogonal features.

15. The method of claim 14, further comprising:

generating images of the given 3D object from different viewpoints.

16. The method of claim 14, further comprising:

performing volume rendering to render a set of images based on the diffuse and specular reflection parameters.

17. The method of claim 16, wherein conditioning the image generation system comprises providing the captured image of the given 3D object as an input to the feature extractor.

18. The method of claim 16, wherein conditioning the image generation system comprises identifying a random number that is used by the feature extractor to generate photorealistic images of the given 3D object.

19. The method of claim 14, wherein capturing the image of the given 3D object comprises capturing an image of a user's face, and wherein generating images of the given 3D object under different lighting conditions comprises generating an avatar of the user under the different lighting conditions.

20. The method of claim 19, further comprising:

training the image generation system using unlabeled ground truth images of real human faces to obtain the trained model.

21. The method of claim 14, wherein the orthogonal features comprise triplane features.

22. A method of operating a light based image generation system comprising:

with a feature extractor, receiving lighting information and pose information and extracting corresponding geometric features based on the lighting information and the pose information;

decoding the extracted geometric features to produce diffuse and specular reflection parameters;

with a volume renderer, rendering a set of images based on the diffuse and specular reflection parameters;

generating a super resolution image from the set of images; and comparing the super resolution image to one or more ground truth images to adjust weights associated with the light based image generation system.

* * * * *